US007542765B2

(12) United States Patent
Kwun et al.

(10) Patent No.: US 7,542,765 B2
(45) Date of Patent: Jun. 2, 2009

(54) METHOD FOR HANDOFF IN MOBILE COMMUNICATION SYSTEM

(75) Inventors: Jong-Hyung Kwun, Seoul (KR);
Sung-Hyun Cho, Suwon-si (KR);
Jung-Hoon Cheon, Suwon-si (KR);
Chi-Hyun Park, Suwon-si (KR);
Ok-Seon Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 534 days.

(21) Appl. No.: 11/452,033

(22) Filed: Jun. 12, 2006

(65) Prior Publication Data

US 2006/0281461 A1    Dec. 14, 2006

(30) Foreign Application Priority Data

Jun. 10, 2005    (KR) .................. 10-2005-0050058

(51) Int. Cl.
*H04Q 7/20* (2006.01)
*H04Q 7/00* (2006.01)
(52) U.S. Cl. .................. 455/436; 455/452.2; 370/331
(58) Field of Classification Search .............. 455/436, 455/452.2, 438, 442, 562.1, 161.3; 370/331, 370/332
See application file for complete search history.

(56) References Cited

U.S. PATENT DOCUMENTS

| 6,565,686 | B2 | 5/2003 | Bett et al. | |
|---|---|---|---|---|
| 6,628,632 | B1 * | 9/2003 | Dolan | 370/332 |
| 2007/0004415 | A1 * | 1/2007 | Abedi | 455/442 |

FOREIGN PATENT DOCUMENTS

| EP | 0 504 122 | 3/1992 |
|---|---|---|
| EP | 1 530 385 | 11/2004 |
| WO | WO 95/01706 | 1/1995 |
| WO | WO 2005/015922 | 2/2005 |

OTHER PUBLICATIONS

Stavos Tzavidas et al., Clarifications on the Handover Procedure, IEEE 802.16 Broadband Wireless Access Working Group, Jun. 8, 2005.

* cited by examiner

*Primary Examiner*—Charles N Appiah
*Assistant Examiner*—Kiet Doan
(74) *Attorney, Agent, or Firm*—The Farrell Law Firm, PC

(57) ABSTRACT

Disclosed is a handoff method connected with resource allocation in order to prevent QoS degradation, which may occur during or before/after a handoff on account of channel state change resulting from the mobility of a radio communication apparatus. To this end, a serving base station currently-connected to the radio communication apparatus and a target base station to be connected after a handoff periodically or non-periodically measure uplink/downlink channel states in relation to the radio communication apparatus, and the target base station allocates resources (e.g., time slot, specific subcarrier, or specific frequency band) most suitable for the service requested from the radio communication apparatus during a handoff, thereby preventing QoS degradation due to the handoff. In addition, in the case of a radio communication apparatus using multiple antennas, the serving base station notifies the target base station of a multi-antenna operation mode in relation to the radio communication apparatus before finishing a handoff procedure, thereby minimizing QoS degradation due to the handoff.

15 Claims, 6 Drawing Sheets

METHOD FOR HANDOFF IN MOBILE COMMUNICATION SYSTEM

PRIORITY

This application claims the benefit under 35 U.S.C. 119(a) of an application entitled "Method For Handoff In Mobile Communication System" filed in the Korean Intellectual Property Office on Jun. 10, 2005 and assigned Serial No. 2005-50058, the entire contents of which are incorporated herein by reference.

BACKGROUND OF THE INVENTION

1. Field of the Invention

The present invention relates to a method for handoff in a mobile communication system, and more particularly to a handoff method of allocating the most suitable resource for quality of service (QoS) simultaneously with a handoff according to channel states in a mobile station performing the handoff when the handoff occurs due to movement of the mobile station in a mobile communication system.

2. Description of the Related Art

In general, the radio channel state of a mobile station continuously changes due to the mobility of the mobile station. In order to reflect such a characteristic, a system such as an Orthogonal Frequency Division Multiplexing/Orthogonal Frequency Division Multiple Access (OFDM/OFDMA) system estimates the channel state of a mobile station to allocate a range of resources (such as a specific subcarrier group, a specific time slot, etc.) for providing the best QoS between the corresponding mobile station and a base station.

For example, FIG. 1 is a diagram illustrating a handoff procedure and resource allocation in a sectored system. As shown in FIG. 1, favorable resource ranges 'FRA' and 'FRB' for mobile station '1' (MS1) in sectors A and B, respectively, are different. FIG. 2 is a diagram illustrating a handoff procedure and resource allocation upon a handoff between cells. When a handoff is performed between cells, a favorable resource range 'FRS' in a serving cell and a favorable resource range 'FRT' in a target cell are different, similar to the case of the sectored system of FIG. 1.

However, since the resource range allocated as above considers only the channel state between a mobile station and a serving base station to which the mobile station is currently connected, a favorable resource range for a mobile station in a current serving cell may not be a favorable resource range for the mobile station in connection to a neighbor base station other than the current serving cell. Therefore, when a handoff is performed without taking into consideration this situation, resources are allocated without an optimal resource allocation procedure between a mobile station and a target base station to which the mobile station will be connected after the handoff, so that the throughput of a corresponding cell may decrease and the QoS may degrade due to the handoff.

Meanwhile, conventional representative handoff schemes include a network-controlled handoff (NCHO) scheme, a mobile-controlled handoff (MCHO) scheme, a mobile-assisted handoff (MAHO) scheme and a neighbor-assisted handoff scheme. However, these schemes propose only methods for determining if a handoff is performed and controlling loads of serving and target cells according to a handoff, but do not propose a method for adaptively allocating resources according to channel states of a mobile station performing a handoff.

SUMMARY OF THE INVENTION

Accordingly, the present invention has been made to solve the above-mentioned problems occurring in the prior art, and an object of the present invention is to provide a mobile communication system and a handoff method therefor, in which the mobile communication system previously reserves the most suitable resource for a mobile station based on channel estimation performed by a serving base station and a target base station upon a handoff and allocates the reserved resource during the handoff.

To accomplish this object, in accordance with one aspect of the present invention, there is provided a method for performing a handoff to a target base station by selecting the target base station from among neighbor base stations when a mobile station moves away from a serving base station currently-connected to the mobile station, the method including determining if the handoff is generated, by periodically measuring intensities of uplink/downlink signals in relation to the mobile station; estimating radio channels between the mobile station and the neighbor base stations when the handoff is generated; determining if the handoff is performed by using a result of the estimation of the channels between the mobile station and the neighbor base stations; determining a base station, which represents a superior channel state and has a resource adaptable for the mobile station, as the target base station by using the result of the estimation of the channels between the mobile station and the neighbor base stations; enabling the target base station to select the most suitable resource for quality of service (QoS) of the mobile station and a multi-antenna operation mode for the mobile station operating with multiple antennas, by using the result of the estimation of the channels between the mobile station and the neighbor base stations and context information of the mobile station; and allocating the selected resource and the multi-antenna operation mode to the mobile station and performing the handoff, by the target base station, wherein, when the handoff occurs, the resource of the target base station suitable for the mobile station is previously found through the channel estimation, reserved, and allocated during the handoff.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

Figure 1:
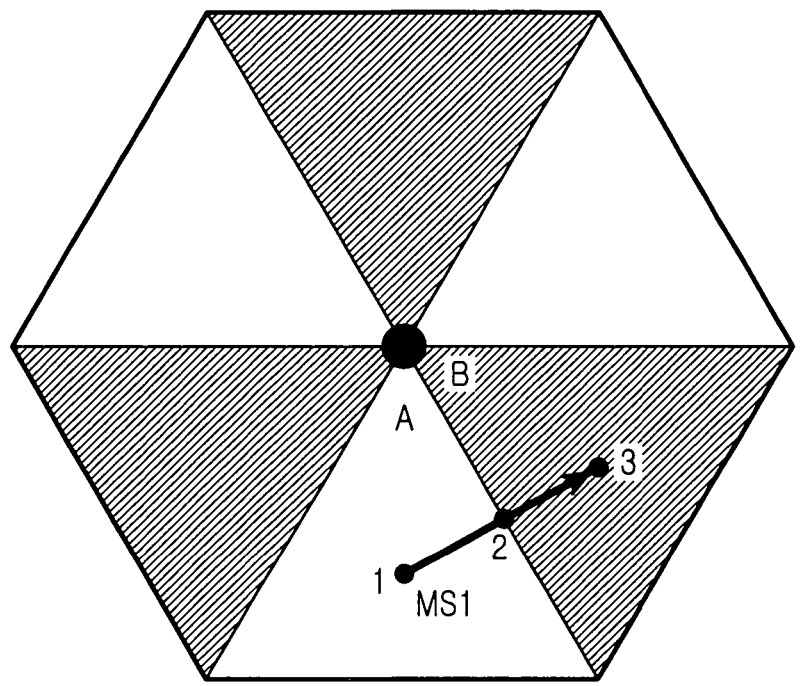
FIG. 1 is a diagram illustrating a handoff procedure and resource allocation in a sectored system.
Figure 1:
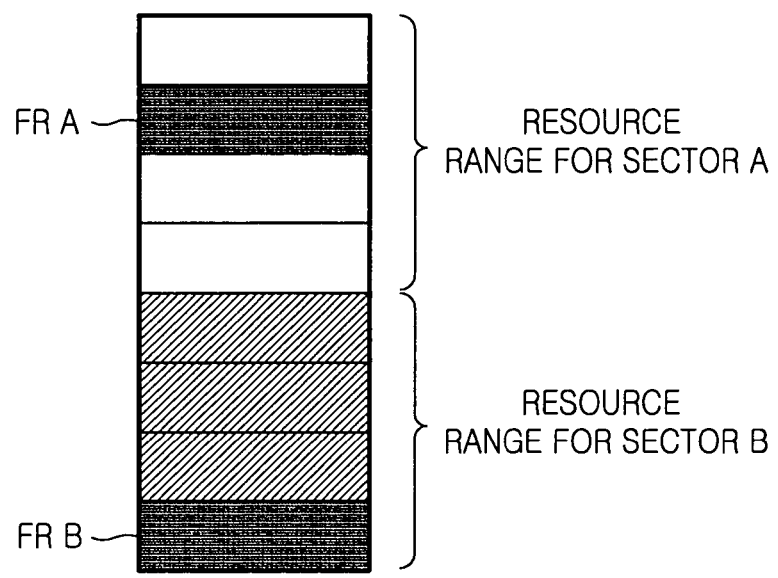
Figure 2:
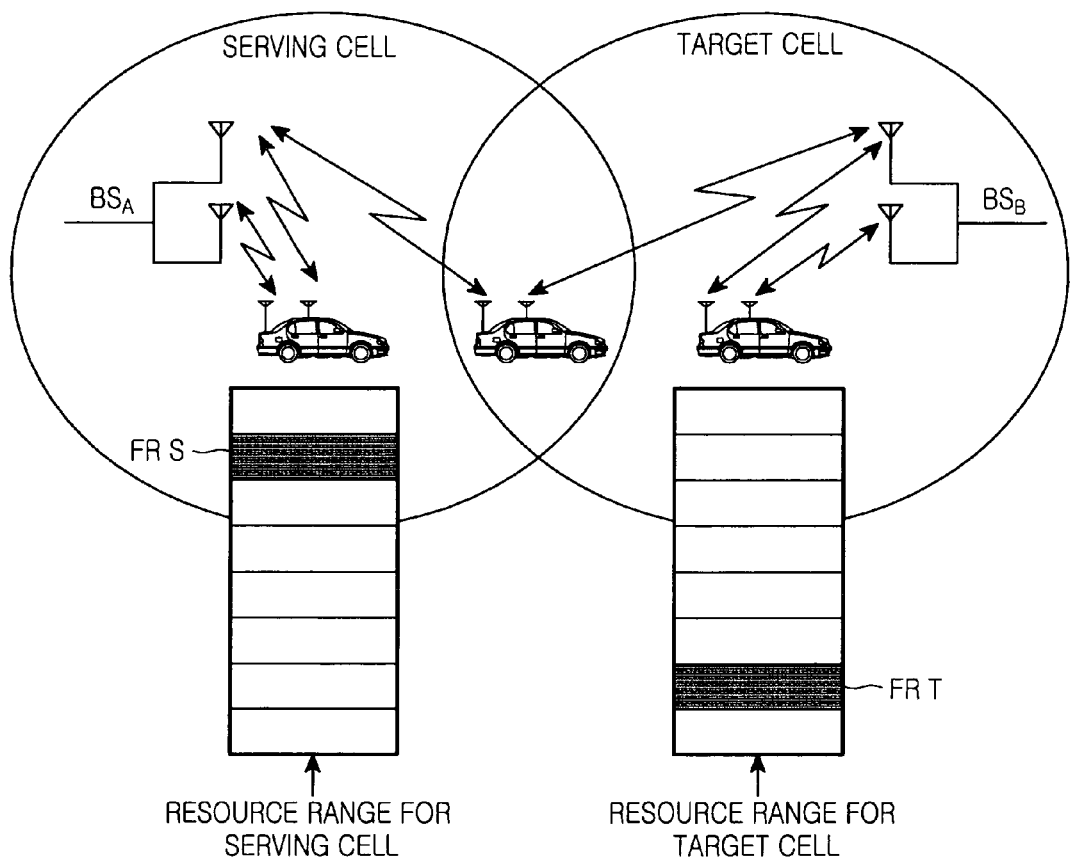
FIG. 2 is a diagram illustrating a handoff procedure and resource allocation upon a handoff between cells.
Figure 3:
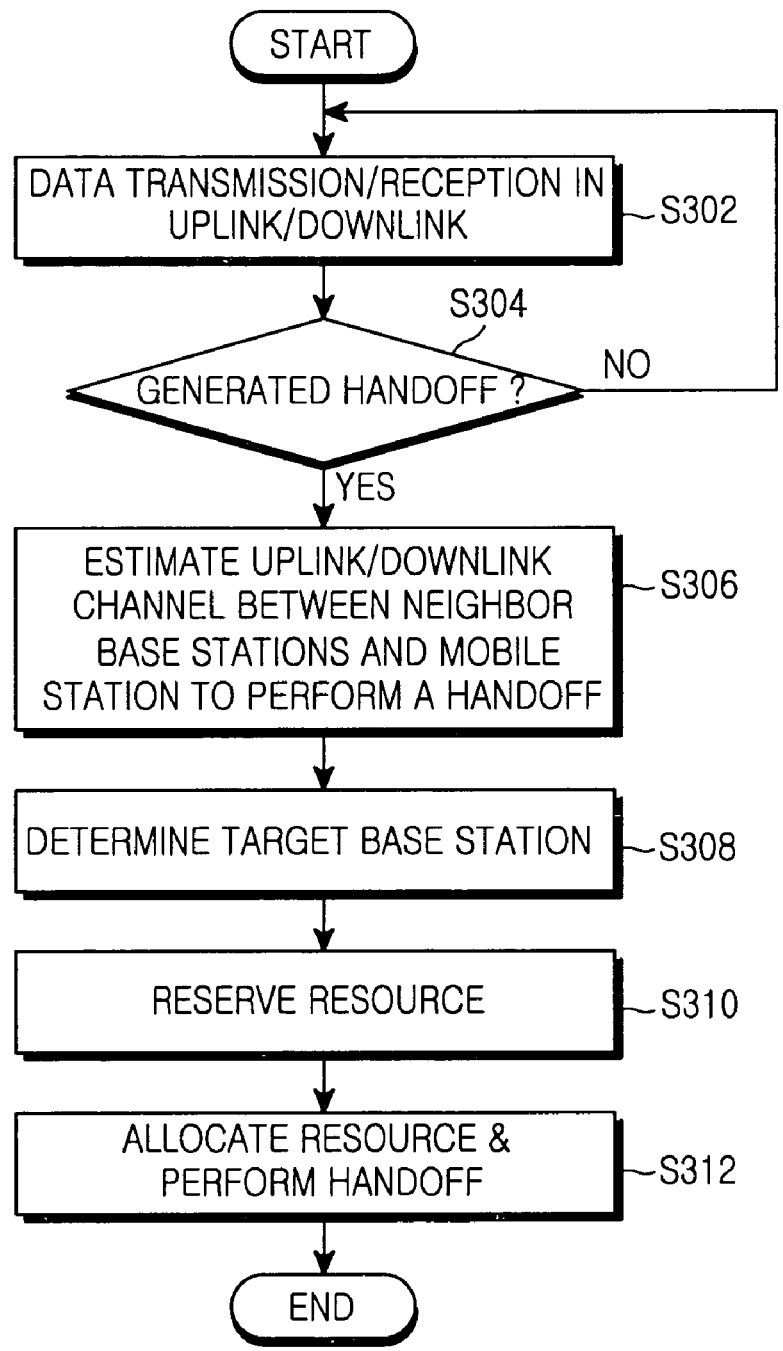
FIG. 3 is a flowchart illustrating a handoff method according to the present invention.

FIG. 3 is a flowchart illustrating a handoff method according to the present invention.

In the case in which a mobile station, which maintains a session for uplink/downlink data transmission/reception in step 302, moves to a cell boundary area, when the mobile station's channel transmission/reception state to the serving base station decreases below a threshold level and the mobile station's channel transmission/reception state to a neighbor serving base station increases above a threshold level, a handoff occurs at step 304.

Then, uplink/downlink channels between the mobile station performing the handoff and neighbor base stations are estimated in step 306. In step 308, from among the neighbor base stations, a neighbor base station representing the highest quality channel state and having a resource adaptable for the mobile station is determined as a target base station.

When the target base station is determined, the target base station reserves the most suitable resource for quality of service (QoS) for the mobile station based on a result of uplink/downlink channel estimation for the mobile station to perform the handoff in step 310. In this case, the resource may include a time slot, a spreading code, a specific frequency range, etc. In addition, if the mobile station operates with multiple antennas, a multi-antenna mode to be used by the target base station is selected at this time.

Finally, the reserved resource is allocated to the mobile station to perform the handoff and, simultaneously, the handoff is executed in step 312.

According to the present invention as described above, when a handoff is generated, a resource of a target base station is reserved in advance by finding the resource suitable for a corresponding mobile station through channel estimation, and then the reserved resource is allocated to the mobile station during the handoff.

Such a handoff may be executed in various methods according to schemes for determining a handoff time point and subjects for determining a handoff direction, which will be described in detail with various embodiments.

Figure 4:
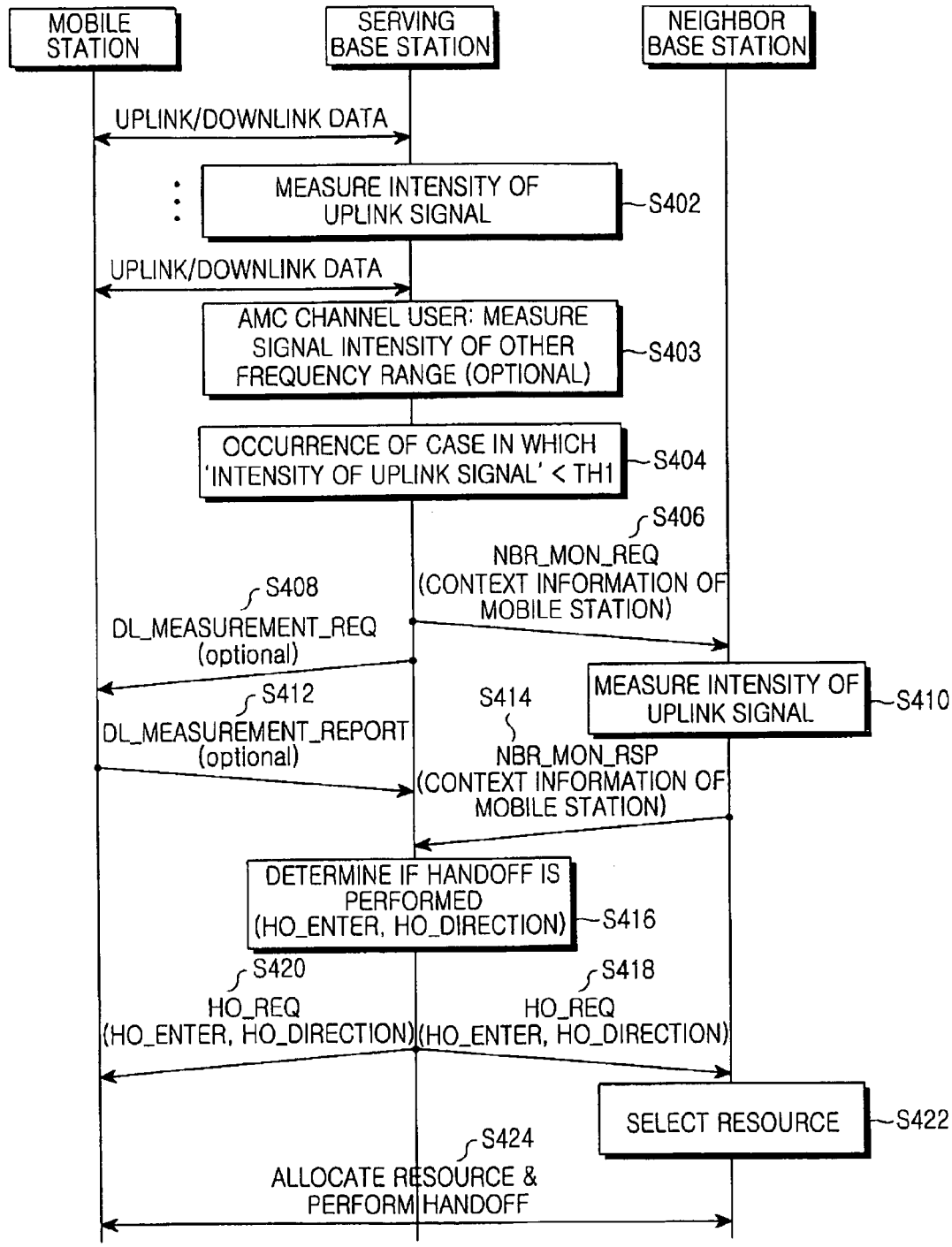
FIG. 4 is a flow diagram illustrating a handoff method according to a first embodiment of the present invention.

FIG. 4 is a flow diagram illustrating a handoff method according to a first embodiment of the present invention.

During data communication with a mobile station through an uplink/downlink, a serving base station measures the intensity of an uplink signal of the mobile station by using a traffic channel or uplink pilot signal in step 402. When the user of the mobile station is an adaptive-modulation-and-coding (AMC) channel user using only a part of channel ranges in an OFDM system or the like, degradation of the signal intensity may have been caused by deep fading only in the relevant frequency range. This may cause a mobile station, which does not need to perform a handoff, to perform a handoff procedure, so it is required to compensate for such a problem. In order to this problem, when a signal of a frequency range, which is currently in use by an AMC channel user, drops below a threshold value, other frequency ranges are selectively allocated and also the intensities of signals of other frequency ranges are checked in step 403. When the difference between the signal intensity of a specific frequency range, which is below the threshold value, and an average signal intensity of all the frequency ranges is more than a predetermined threshold value, this means that only the signal of the specific frequency range is degraded, so another frequency range is allocated to a corresponding mobile station and handoff is not performed. In contrast, when the difference between the signal intensity of the specific frequency range, which is below the threshold value, and an average signal intensity of all the frequency ranges is less than the predetermined difference threshold value, this means that all signals over the entire frequency ranges are degraded, so a handoff is performed.

When the intensity of an uplink signal between the serving base station and the mobile station drops below a threshold value 'TH1' in step 404, the serving base station requests neighbor base stations to estimate an uplink channel of the mobile station through an 'NBR_MON_REQ' message in step 406, and selectively requests the mobile station to estimate downlink channels of the serving base station and neighbor base stations through a 'DL_MEASUREMENT_REQ' message in step 408, thereby initializing the handoff procedure. Herein, it is preferred if the 'channel estimation' includes the procedure of measuring signal intensity of each channel by estimating channels of a corresponding link. Preferably, while requesting the neighbor base stations to estimate an uplink channel of the mobile station, the serving base station transmits the context information of the mobile station (i.e., the uplink frequency which is currently in use, time alignment information, CID (Connection Identifier), a multi-antenna operation mode, etc.) to the neighbor base stations so that the neighbor base stations can facilitate an uplink channel estimation procedure with the mobile station.

Then, each of the neighbor base stations measures the intensity of an uplink signal of the mobile station to perform a handoff in step 410, and transmits the measured intensity value 'NBR_MON_RSP' to the serving base station in step 414. In addition, the mobile station selectively transmits estimation results 'DL_MEASUREMENT_REPORT' (including measured values of downlink signal intensities) of downlink channels of the serving base station and neighbor base stations to the serving base station in step 412.

The serving base station determines if it is required to perform a handoff depending on measured results of uplink/downlink signal intensities between the mobile station and the neighbor base stations in step 416. In this case, the serving base station determines the neighbor base station representing the superior channel state and having a resource adaptable for the mobile station as a target base station.

When determining to perform a handoff, the serving base station transmits a handoff request message 'HO_REQ' to the base station, which has been determined as a target base station, together with the result of downlink channel estimation received from the mobile station in step 418. In this case, the serving base station also transmits the handoff request message 'HO_REQ' to the mobile station in step 420. The handoff request message includes handoff decision information 'HO_ENTER' and handoff direction information 'HO_DIRECTION'

In step 422, the target base station having received the handoff request message selects the most suitable resource for QoS of the mobile station and a multi-antenna operation mode if the mobile station operates with multiple antennas, on the basis of the measured result of an uplink channel state with the mobile station which has been obtained in step 410 and the result of downlink channel estimation received from the serving base station. In step 424, the target base station allocates the selected resource and the multi-antenna operation mode to the mobile station and simultaneously performs the handoff procedure. Herein, it is preferred that information about QoS of the mobile station and the multi-antenna operation mode recognized by the serving base station is transmitted to the neighbor base stations while the serving base station is transmitting the context information of the mobile station.

Meanwhile, in step 410, the neighbor base stations may measure the intensity of an uplink signal of the mobile station by one of the following three methods.

According to the first method (Passive Mode), when the serving base station transmits the context information of the mobile station to the neighbor base stations, each of the neighbor base stations receives an uplink signal of the mobile station by using the information about the mobile station having been received from the serving base station, and measures the intensity of the received uplink signal.

According to the second method (Active Mode), the neighbor base stations request the mobile station to provide a uplink pilot signal.

According to the third method (Assisted Mode) which is a further precise uplink channel estimation method, each of the neighbor base stations prevents a resource, which is currently in use by the mobile station, from being used in its own cell, by using the context information of the mobile station having received from the serving base station.

Figure 5:
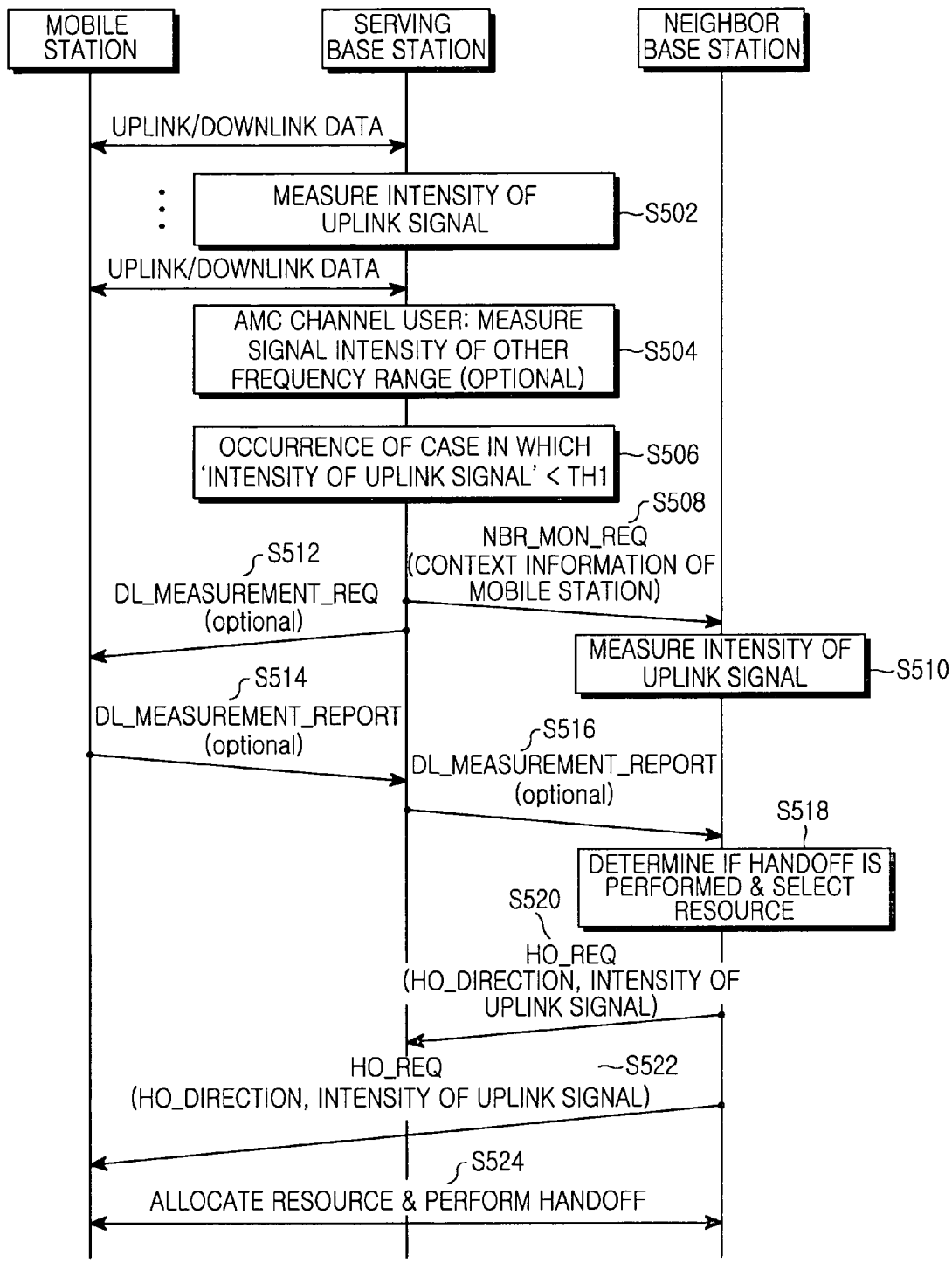
FIG. 5 is a flow diagram illustrating a handoff method according to a second embodiment of the present invention.

FIG. 5 is a flow diagram illustrating a handoff method according to a second embodiment of the present invention. Different from the case shown in FIG. 4, FIG. 5 illustrates a case in which a neighbor base station, which can be the target base station, determines if it is required to perform a handoff, and not a serving base station.

During data communication with a mobile station through an uplink/downlink, a serving base station measures the intensity of an uplink signal of the mobile station by using a traffic channel or uplink pilot signal in step 502. In the case in which the user of the mobile station is an AMC channel user using only a part of channel ranges in the OFDM system or the like, when the signal intensity of a frequency range currently in use drops below a threshold value, a different frequency range is allocated and the signal intensity of the allocated frequency range is checked in step 504, similarly as described with reference to FIG. 4.

When the intensity of an uplink signal between the serving base station and the mobile station drops below a threshold value 'TH1' in step 506, the serving base station requests the neighbor base stations to estimate an uplink channel of the mobile station through an 'NBR_MON_REQ' message in step 508, thereby initializing a handoff procedure. Herein, it is preferred if the 'channel estimation' includes the procedure of measuring signal intensity of each channel by estimating channels of a corresponding link. Preferably, while requesting the neighbor base stations to estimate an uplink channel of the mobile station, the serving base station transmits the context information of the mobile station to the neighbor base stations.

Then, each neighbor base station measures the intensity of an uplink signal of the mobile station in step 510. Herein, the measurement for an uplink signal of the mobile station may be performed by using one of the three methods described in step 410.

Meanwhile, the serving base station may selectively request the mobile station to estimate downlink channels of the serving base station and neighbor base stations in step 512, thereby transmitting, to the mobile station and to the neighbor base stations, estimation results (including measured values of downlink signal intensities) of downlink channels from the serving base station in steps 514 and 516, respectively.

In step 518, each of the neighbor base stations determines if it is required to perform a handoff, on the basis of the measured result of uplink signal intensity of the mobile station (as well as the estimation result of a downlink channel received by the mobile station if steps 512 to 516 have been performed) and simultaneously selects the resource most suitable for QoS of the mobile station and a multi-antenna operation mode if the mobile station operates with multiple antennas. Herein, it is preferred that information about QoS of the mobile station and the multi-antenna operation mode is transmitted to the neighbor base stations, while the serving base station is transmitting the context information of the mobile station.

When it is determined that a handoff is performed in step 518, a corresponding neighbor base station transmits a handoff request message 'HO_REQ' to the serving base station and mobile station in steps 520 and 522, respectively. The handoff request message includes handoff direction information 'HO-DIRECTION'. In this case, it is preferred that a measured value of an uplink signal intensity between the corresponding neighbor base station and mobile station, which has been obtained in step 510, is transmitted together with the handoff request message.

As describe above, FIG. 5 shows a handoff method when there are a plurality of neighbor base stations. Therefore, multiple neighbor base stations may simultaneously transmit handoff request messages to one mobile station to perform a handoff. In this case, the mobile station directly selects a target base station, to which the mobile station is handed-off, from among multiple neighbor base stations, on the basis of the information about uplink signal intensities transmitted together with the handoff request messages from the neighbor base stations and the downlink channel estimation information obtained by the mobile station, and then reports the selected result to the serving base station and the selected target base station.

Then, the neighbor base station selected as a target base station allocates the mobile station with the resource selected in step 518 and performs a handoff procedure in step 524.

Figure 6:
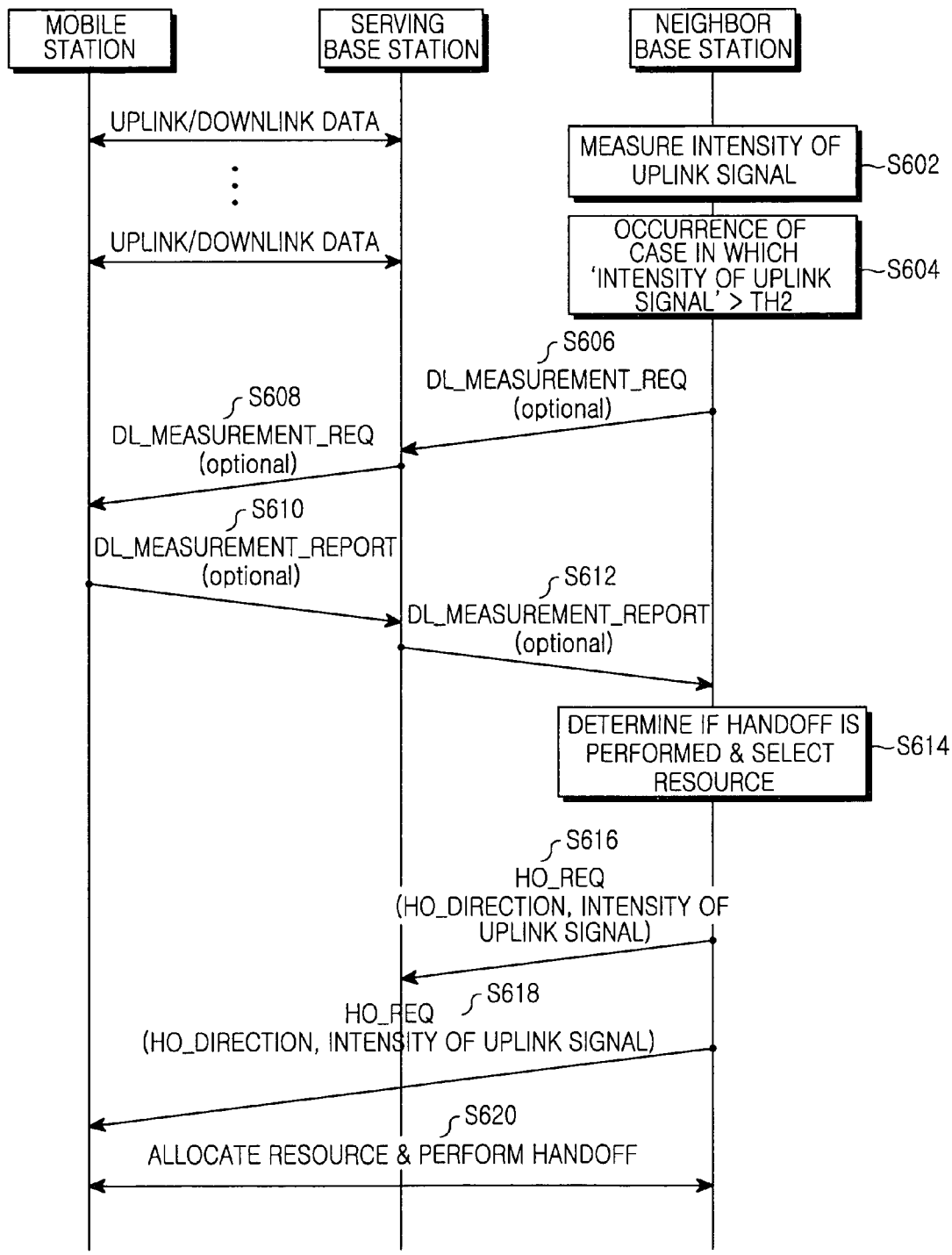
FIG. 6 is a flow diagram illustrating a handoff method according to a third embodiment of the present invention.

FIG. 6 is a flow diagram illustrating a handoff method according to a third embodiment of the present invention. According to FIG. 6, the neighbor base stations, which can be selected as a target base station, may serve as a subject for initializing a handoff and for determining the handoff operation.

Base stations periodically measure the intensities of uplink signals transmitted from neighbor cells. Therefore, neighbor base stations of a serving base station shown in FIG. 6 measure intensities of uplink signals transmitted from neighbor cells in step 602. Herein, the measurement for uplink signal intensities may be performed either using a traffic channel or uplink pilot signal or using one of the three methods described in step 410.

When a value of the measured uplink signal intensities exceeds a threshold value 'TH2', each corresponding neighbor base station initializes a handoff procedure in step 604.

Meanwhile, in order to more precisely determine if it is required to perform a handoff, the neighbor base stations may selectively request only the mobile station, which has been determined as having the uplink signal having an intensity exceeding the threshold value 'TH2' through the measurement of step 602, to estimate downlink channels of the serving base station and neighbor base stations, and then the neighbor base stations receive the result of the estimation in steps 606 to 612.

In step 614, each of the neighbor base stations determines if it is required to perform a handoff, on the basis of the measured result of an uplink signal intensity of the mobile station (as well as the estimation result of a downlink channel if steps 606 to 612 have been performed) and, simultaneously, selects the most suitable resource for QoS of the mobile station and a multi-antenna operation mode if the mobile station operates with multiple antennas.

Then, neighbor base stations transmit a handoff request message 'HO_REQ' to the serving base station and mobile station in steps 616 and 618, respectively. The handoff request message includes handoff direction information 'HO-DI-RECTION'. In this case, it is preferred that a measured value of an uplink signal intensity between each corresponding neighbor base station and the mobile station, which has been obtained in step 602, is transmitted together with the handoff request message.

As described above, FIG. 6 shows a handoff method when there are a plurality of neighbor base stations. Therefore, multiple neighbor base stations may simultaneously transmit handoff request messages to one mobile station to perform a handoff. In this case, the mobile station directly selects a target base station, to which the mobile station is handed-off, from among multiple neighbor base stations, on the basis of both the information about uplink signal intensities transmitted together with the handoff request messages from the neighbor base stations and the downlink channel estimation information obtained by the mobile station, and then reports the selected result to the serving base station and the selected target base station.

Then, the base station selected as a target base station allocates the mobile station with the resource selected in step 614 and performs a handoff procedure in step 620.

As described above, the handoff method according to the present invention uses not only the intensity of a downlink signal between a mobile station performing a handoff and its serving base station, but also information about uplink/downlink signal intensities and channels measured between the mobile station and a target base station when determining if a handoff is required. As a result, the method according to the present invention determines a more precise handoff time point, so that call cut-off due to handoff can be reduced.

In addition, according to the handoff method of the present invention, uplink channel information is estimated and is used in resource allocation for a mobile station to perform a handoff, so that it is possible to minimize degradation of QoS which may occur during a handoff. In addition, in the case of a radio communication apparatus using multiple antennas, the serving base station notifies the target base station of a multi-antenna operation mode in relation to the radio communication apparatus before finishing a handoff procedure, thereby minimizing the degradation of QoS caused by a handoff.

Also, when the present invention is applied to a system such as an IEEE 802.16 system using a part of channel ranges in an entire bandwidth, it can be expected that the throughput of the system is improved and superior QoS is ensured during the handoff operation.

In addition, in the case of a sectored system, since users moving at a low speed and receiving service at a high data rate may frequently perform a handoff, the present invention may have a more significant effect.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for performing a handoff to a target base station by selecting the target base station from among neighbor base stations when a mobile station moves away from a serving base station currently-connected to the mobile station, the method comprising:
   determining if the handoff is generated, by periodically measuring intensities of uplink/downlink signals in relation to the mobile station;
   estimating radio channels between the mobile station and the neighbor base stations when the handoff is generated;
   determining if the handoff is performed using a result of the estimation of the channels between the mobile station and the neighbor base stations;
   determining a base station, which represents a superior channel state and has a resource adaptable for the mobile station, as the target base station by using the result of the estimation of the channels between the mobile station and the neighbor base stations;
   enabling the target base station to select the most suitable resource for quality of service (QoS) of the mobile station and a multi-antenna operation mode for the mobile station operating with multiple antennas, by using the result of the estimation of the channels between the mobile station and the neighbor base stations and context information of the mobile station; and
   allocating the selected resource and the multi-antenna operation mode to the mobile station and performing the handoff, by the target base station,
   wherein, when the handoff occurs, the resource of the target base station suitable for the mobile station is found through the channel estimation, reserved, and allocated during the handoff.

2. The method as claimed in claim 1, wherein the step of determining if the handoff is generated comprises:
   measuring, by the serving base station, an intensity of an uplink signal between the mobile station and the serving base station, and determining that the handoff is generated when the intensity of the measured uplink signal is less than a predetermined threshold value; and
   providing, by the serving base station, context information of the mobile station to the neighbor base stations, and requesting the neighbor base stations to estimate radio channels between the mobile station and the neighbor base stations.

3. The method as claimed in claim 2, wherein the context information of the mobile station includes an uplink frequency currently in use by the mobile station, time alignment information, CID (Connection Identifier), information about the QoS, and information about the multi-antenna operation mode.

4. The method as claimed in claim 3, wherein, in the step of determining if the handoff is generated, when a user of the mobile station is an adaptive-modulation-and-coding (AMC) channel user and when a signal intensity of a frequency range currently used by the mobile station drops below the predetermined threshold value, the serving base station allocates another frequency range to the mobile station, and also measures and uses a signal intensity of the newly-allocated frequency range.

5. The method as claimed in claim 1, wherein the step of determining if the handoff is performed comprises:
- requesting the mobile station to estimate downlink channels of the neighbor base stations and receiving results of the downlink channel estimation by the serving base station;
- determining if the handoff is to be performed, by the serving base station, using the channel estimation result between the mobile station and the neighbor base stations and the channel estimation result of downlinks between the mobile station and the neighbor base stations; and
- transmitting a handoff request message including handoff direction information to the target base station, by the serving base station.

6. The method as claimed in claim 1, wherein the step of determining the target base station is carried out by the serving base station.

7. The method as claimed in claim 4, wherein the step of determining if the handoff is performed is carried out by the neighbor base stations.

8. The method as claimed in claim 7, wherein, in the step of determining the target base station, each of the neighbor base stations transmits a handoff request message, which includes handoff direction information and a result of channel estimation between the mobile station and a corresponding neighbor base station, to the mobile station, and then the mobile station selects the target base station from among the neighbor base stations using the results of the channel estimation.

9. The method as claimed in claim 8, wherein
- the mobile station receives an estimation request of downlink channels between the mobile station and the neighbor base stations from the serving base station, and transmits estimation results of the downlink channels to the neighbor base stations through the serving base station; and
- determines the target base station using channel estimation results between the mobile station and the neighbor base stations and the channel estimation result of downlink.

10. The method as claimed in claim 9, wherein the step of determining if the handoff is performed is carried out by the neighbor base stations, using the channel estimation result between the mobile station and the neighbor base stations and the channel estimation result of downlinks between the mobile station and the neighbor base stations.

11. The method as claimed in claim 1, wherein, in the step of determining if the handoff is generated, each of the neighbor base stations measures an intensity of an uplink signal between the mobile station and the neighbor base station, and determines that the handoff is generated when the intensity of the measured uplink signal exceeds a predetermined threshold value.

12. The method as claimed in claim 11, wherein the step of determining if the handoff is performed is carried out by the neighbor base stations.

13. The method as claimed in claim 12, wherein, in the step of determining the target base station, each of the neighbor base stations transmits a handoff request message, which includes handoff direction information and a result of channel estimation between the mobile station and a corresponding neighbor base station, to the mobile station, and then the mobile station selects the target base station from among the neighbor base stations using the results of the channel estimation.

14. The method as claimed in claim 13, wherein
- the mobile station receives an estimation request of downlink channels between the mobile station and the neighbor base stations from the neighbor base stations, and transmits estimation results of the downlink channels to the neighbor base stations through the serving base station; and
- determines the target base station using channel estimation results between the mobile station and the neighbor base stations and the channel estimation result of downlink.

15. The method as claimed in claim 14, wherein the step of determining if the handoff is performed is carried out by the neighbor base stations, using the channel estimation result between the mobile station and the neighbor base stations and the channel estimation result of downlinks between the mobile station and the neighbor base stations.

* * * * *